United States Patent
Li et al.

(10) Patent No.: US 9,565,864 B2
(45) Date of Patent: Feb. 14, 2017

(54) **METHOD FOR PRESERVING *ZIZIPHUS JUJUBA***

(71) Applicants: Lingwu Fruits Development Co., Ltd., Yinchuan (CN); Xihong Li, Tianjin (CN)

(72) Inventors: Xihong Li, Tianjin (CN); Zhanru Ma, Yinchuan (CN); Bingfeng Li, Yinchuan (CN); Cai Sun, Yinchuan (CN); Li Li, Tianjin (CN); Aili Wang, Tianjin (CN); Xia Liu, Tianjin (CN)

(73) Assignees: LINGWU FRUITS DEVELOPMENT CO., LTD., Yinchuan (CN); Xihong Li, Tianjin (CN)

( * ) Notice: Subject to any disclaimer, the term of this patent is extended or adjusted under 35 U.S.C. 154(b) by 213 days.

(21) Appl. No.: 14/527,726

(22) Filed: Oct. 29, 2014

(65) Prior Publication Data

US 2015/0056349 A1    Feb. 26, 2015

Related U.S. Application Data

(63) Continuation-in-part of application No. PCT/CN2012/082827, filed on Oct. 12, 2012.

(30) Foreign Application Priority Data

Sep. 4, 2012    (CN) .......................... 2012 1 0323260

(51) Int. Cl.
| | |
|---|---|
| *A23B 7/154* | (2006.01) |
| *A23B 7/144* | (2006.01) |
| *A23B 7/155* | (2006.01) |
| *A23B 7/152* | (2006.01) |
| *A23B 7/157* | (2006.01) |
| *A23B 7/16* | (2006.01) |

(52) U.S. Cl.
CPC .............. *A23B 7/154* (2013.01); *A23B 7/144* (2013.01); *A23B 7/152* (2013.01); *A23B 7/155* (2013.01); *A23B 7/157* (2013.01); *A23B 7/16* (2013.01)

(58) Field of Classification Search
CPC ......... A23B 7/144; A23B 7/152; A23B 7/154; A23B 7/155; A23B 7/157; A23B 7/16
See application file for complete search history.

(56) References Cited

FOREIGN PATENT DOCUMENTS

| CN | 101185459 A | * | 5/2008 |
| CN | 101642163 A | * | 2/2010 |
| CN | 101715998 A | * | 6/2010 |

OTHER PUBLICATIONS

Zhaojun Ban et al ,Zhaojun, Study on the Low Temperature Storage of Lingwu Long Jujubes at Different Levels of Ripeness, China Fruits 2009. Translation provided by FLS, Inc.*
Shen et al, Honokiol and Magnolol as Multifunctional Antioxidative Molecules for Dermatologic Disorders, Sep. 2010, See p. 6458-6459.*
Canon, What You Need to Know About Citric Acid, EthicalFoods, Accessed Jul. 21, 2016 <http://ethicalfoods.com/citric-acid/>.*
Medical Dictionary, Definition of Ethylparaben, Thefreedictionary. com <http://medical-dictionary.thefreedictionary.com/ethylparaben>.*

* cited by examiner

*Primary Examiner* — Viren Thakur
*Assistant Examiner* — Thanh H Nguyen
(74) *Attorney, Agent, or Firm* — Matthias Scholl, PC; Matthias Scholl

(57) ABSTRACT

A method for preserving *Ziziphus jujuba*, including: 1) preservation treatment of the *Ziziphus jujuba* harvested by a) fumigation and b) soaking the *Ziziphus jujuba* in a liquid preservative at room temperature; 2) air-drying the soaked *Ziziphus jujuba* and placing it into polyethylene bags, and then placing the *Ziziphus jujuba* into an inner atmosphere of a jacketed cold and controlled atmosphere storage warehouse and cooling it at 4° C. for 24-48 hours; and after slowly reducing the temperature of the inner atmosphere to −3.0±0.1° C. over a period of 6 days, closing off the inner atmosphere and controlling its composition. During the cooling step, air is circulated between the inner atmosphere and the outer atmosphere of the jacketed cold and controlled atmosphere storage warehouse.

8 Claims, No Drawings

METHOD FOR PRESERVING *ZIZIPHUS JUJUBA*

CROSS-REFERENCES TO RELATED APPLICATIONS

This application is a continuation-in-part of International Patent Application No. PCT/CN2012/082827 with an international filing date of Oct. 12, 2012, designating the United States, now pending, and further claims priority benefits to Chinese Patent Application No. 201210323260.3 filed Sep. 4, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Filed of the Invention

The present invention relates to preservation of farm produce and, more particularly, to a method of preserving *Ziziphus jujuba* and to a liquid preservative used in the method.

Description of the Related Art

Without preservation, *Ziziphus jujuba* will undergo dehydration and lose more than 5% of its weight in the initial 24 hours after being harvested. Dehydration will cause decomposition, accumulation of ethanol and ethylene, and loss of vitamin C. Without preservation, *Ziziphus jujuba* will lose its freshness in 2 or 3 days, and will rot and become unsellable in 5-7 days.

Conventional methods for preserving *Ziziphus jujuba* increase storability to about 1-3 months and the need for an improved method for preserving *Ziziphus jujuba* is long-felt, but unmet.

Phase temperature is a temperature lower than 0° C. and higher than the freezing temperature of an organism. Preservation of farm produce at such temperature can minimize cellular respiration even when the farm produce is fully mature, which effectively extends its shelf life.

Fruits are preferably preserved at their freezing temperature or at a temperature 0.1-0.15° C. higher than their chilling injury temperature, i.e., at preservation temperatures close to the phase change temperature of the cellular membrane of the fruits.

Phase temperature and controlled atmosphere means a combination of a phase temperature technique and a controlled atmosphere. The temperature fluctuation in conventional cold storage or conventional controlled atmosphere storage for fruits is larger than ±0.5° C., and the preservation temperature thereof is 0.5-1.5° C. higher than the freezing temperature or chilling injury temperature of the fruits, while the temperature fluctuation in phase temperature and controlled atmosphere is smaller than ±0.1° C.

Prior to this invention, there have been no reports of using phase temperature and controlled atmosphere to preserve *Ziziphus jujuba*.

SUMMARY OF THE INVENTION

In view of the above-described problems, it is one objective of the invention to provide a simple, economic method for preserving *Ziziphus jujuba*.

This method utilizes phase temperature and controlled atmosphere to achieve long shelf life and low spoilage rate of *Ziziphus jujuba*. Another objective of the invention is to provide a liquid preservative for use in this method.

*Ziziphus jujuba* has a freezing temperature of −4.0±0.2° C., a chilling injury temperature at the primary stage of storage of −4±0.5° C., and an optimal preservation temperature of −3° C. Therefore, in the first 10 days of storing *Ziziphus jujuba* in a storage warehouse, the temperature must be reduced rapidly until it is close to the chilling injury temperature of the *Ziziphus jujuba*, and then the cooling rate must be decreased.

In accordance with an exemplary embodiment of the invention, provided is a method for preserving *Ziziphus jujuba*, the method comprising:

1) preservation treatment of harvested *Ziziphus jujuba*, which comprises the following:
   a) the *Ziziphus jujuba* is fumigated by 1-methylcyclopropene in a closed environment for 8-24 hours; and
   b) the *Ziziphus jujuba* is soaked in a liquid preservative at room temperature, the liquid preservative comprising by weight:
      an antibacterial agent: 0.1-0.5 wt %;
      an antifungal agent: 0.01-0.05 wt %;
      an anti-aging agent: 0.5-5.0 wt %;
      a growth regulator: 50-150 ppm;
      a bio coating agent: 0.5-1.5 wt %;
      an emulsifier: 0.2-1.0 wt %; and
      the balance being water; and 2) the soaked *Ziziphus jujuba* is air-dried and then placed into polyethylene (PE) bags; next, the packed *Ziziphus jujuba* is transferred into an inner atmosphere of a jacketed cold and controlled atmosphere storage warehouse and cooled at 4° C. for 24-48 hours. Then, the storage temperature is slowly reduced by 2° C. per day to −3.0±0.1° C. over a period of 4-6 days. Then, the inner atmosphere is closed off and the concentrations of oxygen and carbon dioxide therein are adjusted to be 2-3 v/v % and lower than 1 v/v %, respectively; meanwhile, both of the concentrations of exogenous ethylene and ethanol in the inner atmosphere are controlled to be lower than 1 mg per kilogram of the *Ziziphus jujuba*, and the relative humidity in the inner atmosphere is controlled to be 95-98%.

In the above-mentioned cooling step, the temperature of the outer atmosphere of the jacketed cold and controlled atmosphere storage warehouse is 4±0.5° C. When the temperature of the inner atmosphere is slowly reduced over 4-6 days, the temperature of the outer atmosphere is first controlled at 0±0.5° C. for 2-3 days, and then at −4±0.5° C. for 2-3 days.

In the first 20 days after the inner atmosphere is closed off, the temperature of the outer atmosphere is controlled at −4±0.5° C. until the temperature of the *Ziziphus jujuba* reaches −3° C.; and then temperature of the outer atmosphere is adjusted to be −3.5±0.5° C. or to correspond to the actual fruit temperature.

In the cooling step, an axial fan circulates air between the inner atmosphere and the outer atmosphere; and the amount of the air circulated per hour is 15-20 times of the volume of the inner atmosphere.

In a class of this embodiment, the *Ziziphus jujuba* of step 1) is harvested in a medium mature state.

In a class of this embodiment, the preservation treatment is carried out within 2-4 hours after the harvest of the *Ziziphus jujuba*.

In a class of this embodiment, in step a), the concentration of the 1-methylcyclopropene in the closed environment is 1-3 µL/L.

In a class of this embodiment, the Ziziphus jujuba air-dried and packed is transferred into the warehouse preferably on the same day as the harvest of the Ziziphus jujuba and, more preferably, within 10 hours after the harvest of the Ziziphus jujuba.

In a class of this embodiment, the antibacterial agent is nisin; the antifungal agent is natamycin or propylparaben; the anti-aging agent is anhydrous calcium chloride; the growth regulator is gibberellin; the bio coating agent is chitosan; and the emulsifier is propanediol or acetic acid.

In a class of this embodiment, the Ziziphus jujuba is soaked in the liquid preservative for 3-10 min.

In a class of this embodiment, after the dried Ziziphus jujuba is placed in PE bags, the bags are maintained in an opened state and cooled until the temperature of the Ziziphus jujuba reaches −0.5-−1° C., then the bags are closed and stored in the jacketed cold and controlled atmosphere storage warehouse at −3-0° C.

In a class of this embodiment, the Ziziphus jujuba is Lingwu long jujube (Zizyphus jujuba cv. Mill). Lingwu long jujube is a special species of Ziziphus jujuba cultivated in Ningxia, China. It is of bright color, crisp and refreshing taste, balanced sweet and sour flavor, and particular richness in nutrients.

Another objective of the invention is to provide a method for preparing the liquid preservative used in the method for preserving Ziziphus jujuba, comprising:
1) dissolving the antifungal agent in the emulsifier to obtain a solution of the antifungal agent;
2) dissolving the antibacterial agent, the anti-aging agent, the growth regulator, and the bio coating agent in water to obtain their solutions, respectively; and
3) mixing the five solutions obtained in steps 1) and 2) with additional water.

The method of the invention inhibits the aging process, cellular respiration, and enzyme activities of the Ziziphus jujuba by using preservatives and controlled atmosphere. It prevents occurrence of mildew, dehydration, and color change of the Ziziphus jujuba and achieves long shelf life thereof easily and economically.

By the method of the invention, Ziziphus jujuba is able to be stored at −±0.1° C. for 120-130 days while achieving a spoilage rate of 5%, a softened fruit rate of 10%, a hardness of the Ziziphus jujuba higher than 11 kg/cm$^2$, a soluble solid content of 23-25%, and a sellable fruit rate higher than 95%. The method of the invention achieves a storage time of Ziziphus jujuba which is 40-50% longer than that of conventional methods and preserves the fresh flavor and appearance of the Ziziphus jujuba during storage.

DETAILED DESCRIPTION OF THE EMBODIMENTS

The basic principle of preserving fruits is storing the fruits at a temperature as low as possible without causing freezing or chilling injury of the fruits. In the temperature range of 0-35° C., the respiration rate of the fruits increases by two or three times when the temperature rises every 10° C., which is represented as temperature coefficient $Q_{10}$. The changes of the respiration rate of the fruits also lead to corresponding changes of their shelf lives.

Storing fruits at a temperature as low as possible reduces the respiration of the fruits to a minimum level, which decreases the release of ethylene from the fruits and avoids the accumulation of ethanol therein, inhibits the activities of microorganisms and enzymes, and avoids freezing and chilling injury of the cellular membrane of the fruits.

The inner atmosphere of the jacketed cold and controlled atmosphere storage warehouse can be closed air-tight; and the outer atmosphere is the atmosphere of the cold storage room. During the cooling step, an axial fan mixes air of the inner atmosphere and the outer atmosphere so that heat and material exchanges are carried out between those two atmospheres; and when the temperature of the fruits becomes close to or reaches the optimal preservation temperature, the inner atmosphere is closed off and, therefore, there is only heat exchange but no material exchange (including water and air exchanges) between the inner and the outer atmospheres.

Advantages of the invention are summarized below:

1. This method can maintain a high humidity of the inner atmosphere without humidification, which avoids dehydration and wilting of the fruits;

2. Since the evaporator of the refrigeration device is set in the outer atmosphere, the temperature and the humidity of the outer atmosphere changes when the evaporator frosts up during the cooling process. In the method of the invention, because the environment of the closed inner atmosphere is separated from the outer atmosphere, the humidity inside the inner atmosphere as well as the dehydration process of the fruits therein is not affected by the humidity changes of the outer atmosphere, which solves the problems of humidification and defrosting in conventional cold storage warehouses and conventional controlled atmosphere cold warehouses; and 3. The inner atmosphere can be adjusted in accordance with the type of fruits stored therein; and the air in the outer atmosphere is normal so as to allow free access for checking and maintenance of the equipment.

DETAILED DESCRIPTION OF THE EMBODIMENTS

Example 1

Preparation of the Liquid Preservative

To prepare 1000 g of liquid preservative, the following materials were provided:
nisin 1.0 g;
natamycin 0.3 g;
anhydrous calcium chloride 10.0 g;
gibberellin 0.1 g;
chitosan 10.0 g;
acetic acid 5.0 g; and
the balance of water.

The natamycin was dissolved in the acetic acid. The nisin, anhydrous calcium chloride, gibberellin, and chitosan were dissolved in adequate amounts of water, respectively. The five solutions were mixed with the left water to obtain the liquid preservative.

Example 2

Preparation of the Liquid Preservative

To prepare 1000 g of liquid preservative, the following materials were provided:
nisin 5.0 g;
propylparaben 0.1 g;
anhydrous calcium chloride 50.0 g;

gibberellin 0.05 g;
chitosan 15.0 g;
propanediol 10.0 g; and
the balance of water.

The propylparaben was dissolved in the propanediol. The nisin, anhydrous calcium chloride, gibberellin, and chitosan were dissolved in adequate amounts of water, respectively. The five solutions were mixed with the left water to obtain the liquid preservative.

Example 3

There was provided a method for preserving *Ziziphus jujuba* using the preservative of Example 1, the method comprising:

1) preservation treatment of medium mature *Ziziphus jujuba* started within 2 hours after the harvest of the *Ziziphus jujuba*, comprising:

a) the *Ziziphus jujuba* was fumigated by 1 μL/L 1-methylcyclopropene in a closed environment for 24 hours; and b) the *Ziziphus jujuba* was soaked in the liquid preservative for 5 min at room temperature;

2) the soaked *Ziziphus jujuba* was air-dried and then placed into PE bags. Next, the *Ziziphus jujuba* was transferred into the inner atmosphere of a jacketed cold and controlled atmosphere storage warehouse and cooled at 4° C. for 24 hours. Then, the temperature of the inner atmosphere was slowly reduced by 2° C. per day to −3.0±0.1° C. over a period of 6 days. Then, the inner atmosphere was closed off and the concentrations of oxygen and carbon dioxide therein were adjusted to be 2 v/v % and 0.8 v/v %, respectively. Meanwhile, both of the concentrations of exogenous ethylene and ethanol in the inner atmosphere were controlled to be lower than 1 mg per kilogram of the *Ziziphus jujuba*, and the relative humidity in the inner atmosphere was controlled to be 95%.

During the cooling step, the temperature of the outer atmosphere of the jacketed cold and controlled atmosphere storage warehouse was −4.0±0.5° C. When the temperature of the inner atmosphere was slowly reduced over a period of 6 days, the temperature of the outer atmosphere was first controlled at 0±0.5° C. for 3 days, and then at −4±0.5° C. for 3 days. In the first 20 days after the inner atmosphere was closed off, the temperature of the outer atmosphere was controlled at −4±0.5° C. until the temperature of the fruits reached −3° C.; and then the temperature of the outer atmosphere was adjusted to be −3.5±0.5° C. or to correspond to the actual fruit temperature. During the cooling step, air was circulated between the inner atmosphere and the outer atmosphere by using an axial fan such that the inner atmosphere and the outer atmosphere were intermixed, and the amount of the air circulated per hour was 20 times the volume of the inner atmosphere.

In step 2), the dried *Ziziphus jujuba* was placed in PE bags and cooled while the bags were maintained in an opened state until the fruit temperature reached −0.5--1° C., then the bags were closed and stored in the jacketed cold and controlled atmosphere storage warehouse at −3-0° C.

The *Ziziphus jujuba* stored by the above method for 130 days had a spoilage rate of 5%, a softened fruit rate of 10%, a hardness of the *Ziziphus jujuba* higher than 11 kg/cm$^2$, a soluble solid content of 25%, and a sellable fruit rate higher than 95%. The method achieved a storage time of *Ziziphus jujuba* which was 40-50% longer than that using conventional methods and preserved the fresh flavor and appearance of the *Ziziphus jujuba* during storage.

Example 4

There was provided a method for preserving *Ziziphus jujuba* using the preservative of Example 2, the method comprising:

1) preservation treatment of medium mature *Ziziphus jujuba* started within 4 hours after the harvest of the *Ziziphus jujuba*, comprising:

a) the *Ziziphus jujuba* was fumigated by 1 μL/L 1-methylcyclopropene in a closed environment for 8 hours; and b) the *Ziziphus jujuba* was soaked in the liquid preservative for 10 min at room temperature;

2) the soaked *Ziziphus jujuba* was air-dried and then placed into PE bags. Next, the *Ziziphus jujuba* was transferred into the inner atmosphere of a jacketed cold and controlled atmosphere storage warehouse within 10 hours after harvest and cooled at 4° C. for 28 hours. Then, the temperature of the inner atmosphere was slowly reduced by 2° C. per day to −3.0±0.1° C. over a period of 6 days. Then, the inner atmosphere was closed off and the concentrations of oxygen and carbon dioxide therein were adjusted to be 2 v/v % and 0.8 v/v %, respectively. Meanwhile, both of the concentrations of exogenous ethylene and ethanol in the inner atmosphere were controlled to be lower than 1 mg per kilogram of the *Ziziphus jujuba*, and the relative humidity in the inner atmosphere was controlled to be 98%.

During the cooling step, the temperature of the outer atmosphere of the jacketed cold and controlled atmosphere storage warehouse was −4.0±0.5° C. When the temperature of the inner atmosphere was slowly reduced over a period of 6 days, the temperature of the outer atmosphere was first controlled at 0±0.5° C. for 2 days, and then at −4±0.5° C. for 2 days. In the first 20 days after the inner atmosphere was closed off, the temperature of the outer atmosphere was controlled at −4±0.5° C. until the temperature of the fruits reached −3° C.; and then the temperature of the outer atmosphere was adjusted to be −3.5±0.5° C. or to correspond to the actual fruit temperature. During the cooling step, air was circulated between the inner atmosphere and the outer atmosphere by using an axial fan such that the inner atmosphere and the outer atmosphere were intermixed, and the amount of the air circulated per hour was 15 times the volume of the inner atmosphere.

In step 2), the dried *Ziziphus jujuba* was placed in PE bags and cooled while the bags were maintained in an opened state until the fruit temperature reached −0.5--1° C., then the bags were closed and stored in the jacketed cold and controlled atmosphere storage warehouse at −3-0° C.

The *Ziziphus jujuba* stored by the above method for 120 days had a spoilage rate of 6%, a softened fruit rate of 7%, a hardness of the *Ziziphus jujuba* higher than 10 kg/cm$^2$, a soluble solid content of 23%, and a sellable fruit rate higher than 95%. The method achieved a storage time of *Ziziphus jujuba* which was 45% longer than that using conventional methods and preserved the fresh flavor and appearance of the *Ziziphus jujuba* during storage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preserving *Ziziphus jujuba*, the method comprising:
   a) harvesting *Ziziphus jujuba*;
   b) fumigating the *Ziziphus jujuba* with 1-methylcyclopropene in a closed environment for 8-24 hours, and then soaking the *Ziziphus jujuba* in a liquid preservative at room temperature, the liquid preservative comprising:
      an antibacterial agent at 0.1-0.5 wt %;
      an antifungal agent at 0.01-0.05 wt %;
      an anti-aging agent at 0.5-5.0 wt %;
      a growth regulator at 50-150 ppm;
      a bio coating agent at 0.5-1.5 wt %;
      an emulsifier at 0.2-1.0 wt %; and
      the balance being water;
   c) air-drying the *Ziziphus jujuba*, and then placing the *Ziziphus jujuba* into polyethylene (PE) bags;
   d) transferring the PE bags into an inner atmosphere of a jacketed cold and controlled atmosphere storage warehouse, the jacketed cold and controlled atmosphere storage warehouse further comprising an outer atmosphere;
   e) maintaining a temperature of the inner atmosphere at 4° C. for 24-48 hours while maintaining a temperature of the outer atmosphere at 4.0±0.5° C.;
   f) reducing the temperature of the inner atmosphere by 2° C. per day until reaching −3.0±0.1° C. over a period of 4-6 days while first controlling the temperature of the outer atmosphere to 0±0.5° C. for 2-3 days and then to −4±0.5° C. for 2-3 days, and circulating air between the inner atmosphere and the outer atmosphere, wherein an amount of the air circulated between the inner atmosphere and the outer atmosphere per hour is 15-20 times the volume of the inner atmosphere; and
   g) sealing the inner atmosphere and controlling it to have a concentration of oxygen of 2-3 v/v %, a concentration of carbon dioxide lower than 1 v/v %, a concentration of exogenous ethylene lower than 1 mg per kilogram of the *Ziziphus jujuba*, a concentration of exogenous ethanol lower than 1 mg per kilogram of the *Ziziphus jujuba*, and a relative humidity of 95-98%, while controlling the temperature of the outer atmosphere to −4±0.5° C. for 20 days until a temperature of the *Ziziphus jujuba* reaches −3° C. and then maintaining the temperature of the outer atmosphere at −3.5±0.5° C.

2. The method of claim 1, wherein b) further comprises starting fumigating the *Ziziphus jujuba* within 2-4 hours after harvesting the *Ziziphus jujuba*.

3. The method of claim 1, wherein the concentration of 1-methylcyclopropene in the closed environment of b) is 1-3 μL/L.

4. The method of claim 1, wherein d) further comprises transferring the PE bags into the inner atmosphere on the same day as harvesting *Ziziphus jujuba*.

5. The method of claim 4, wherein d) further comprises transferring the PE bags into the inner atmosphere within 10 hours after harvesting *Ziziphus jujuba*.

6. The method of claim 1, wherein
   the antibacterial agent is nisin;
   the antifungal agent is natamycin or propylparaben;
   the anti-aging agent is anhydrous calcium chloride;
   the growth regulator is gibberellin;
   the bio coating agent is chitosan; and
   the emulsifier is propanediol or acetic acid.

7. The method of claim 1, wherein b) further comprises soaking the *Ziziphus jujuba* in the liquid preservative for 3-10 min.

8. The method of claim 1, wherein c) further comprises after placing the *Ziziphus jujuba* into the PE bags, cooling the *Ziziphus jujuba* to a temperature of −0.5--1° C. while maintaining the bags in an opened state, and then closing the bags.

* * * * *